(12) United States Patent
Linnert

(10) Patent No.: US 11,191,221 B2
(45) Date of Patent: Dec. 7, 2021

(54) CONTAINER UTILIZING ANGLE ELEMENTS

(71) Applicant: John W. Linnert, Corona Del Mar, CA (US)

(72) Inventor: John W. Linnert, Corona Del Mar, CA (US)

( * ) Notice: Subject to any disclaimer, the term of this patent is extended or adjusted under 35 U.S.C. 154(b) by 384 days.

(21) Appl. No.: 16/379,548

(22) Filed: Apr. 9, 2019

(65) Prior Publication Data

US 2020/0323150 A1 Oct. 15, 2020

(51) Int. Cl.
*A01G 9/02* (2018.01)
*B65D 6/24* (2006.01)
*A01G 9/00* (2018.01)

(52) U.S. Cl.
CPC ............ *A01G 9/02* (2013.01); *B65D 11/1873* (2013.01); *A01G 2009/003* (2013.01)

(58) Field of Classification Search
CPC .......... A01G 9/02; A01G 9/027; A01G 9/028; A01G 2009/003; B65D 11/188; B65D 11/1866; B65D 11/1873; B65D 11/1886; B65D 11/1893
USPC ....... 217/12 R, 13, 43 R, 45; 220/4.01, 4.24, 220/4.26, 4.27, 4.28, 4.31, 4.32; 273/153 R, 156, 157 A, 157 R, 160
See application file for complete search history.

(56) References Cited

U.S. PATENT DOCUMENTS

| | | | | |
|---|---|---|---|---|
| 1,266,981 A | * | 5/1918 | Olesen | A47B 3/12 108/185 |
| 3,137,096 A | * | 6/1964 | Hopkins | A01G 27/00 47/79 |
| 3,302,949 A | * | 2/1967 | Wolfe | A63H 23/16 472/13 |
| 3,747,268 A | * | 7/1973 | Linder | A01G 9/028 47/67 |

(Continued)

FOREIGN PATENT DOCUMENTS

EP 334122 * 9/1989 ............ A01G 9/10

OTHER PUBLICATIONS

International Application No. PCT/US20/22292, International Search Report and the Written Opinion of the International Searching Authority, or the Declaration dated Jun. 10, 2020 (9 Pages).

*Primary Examiner* — Joshua E Rodden
(74) *Attorney, Agent, or Firm* — Lawrence N. Ginsberg

(57) ABSTRACT

A container, including a number of angle elements. Each angle element includes a) a horizontal puzzle member including a male knob at one end and a female lock at the other end; and, b) a vertical member including a vertically extending male adjunct at one end thereof and a vertically extending female adjunct at the other end thereof, the vertical member being integrally orthogonally connected to the horizontal puzzle member. The angle elements are configurable, i.e. can be assembled, to form a container by: engagement of the male knobs of the plurality of angle elements with female locks of adjacent angle elements; and, engagement of the vertically extending male adjuncts of the (Continued)

angle elements with female adjuncts of adjacent angle elements. The container may include corner angle elements and additional types of angle elements such as intermediate angle elements, curved angle applications, L-shaped angle elements, etc.

14 Claims, 9 Drawing Sheets

(56) References Cited

U.S. PATENT DOCUMENTS

| | | | | |
|---|---|---|---|---|
| 4,061,084 | A * | 12/1977 | Bakkeren | B65H 31/00 100/1 |
| 4,120,119 | A * | 10/1978 | Engel | A01G 9/027 47/66.1 |
| 4,285,439 | A * | 8/1981 | Dyer | B65D 9/16 217/12 A |
| 4,860,914 | A * | 8/1989 | Derni | E04H 4/0031 220/4.28 |
| 4,912,876 | A * | 4/1990 | Ginsberg | A01G 9/02 47/67 |
| 5,199,589 | A * | 4/1993 | Noble | B65D 19/18 217/15 |
| 5,593,058 | A * | 1/1997 | Spencer | B65D 21/083 217/65 |
| 5,840,377 | A | 11/1998 | Donnell | |
| 5,852,895 | A * | 12/1998 | Sinanan | A01G 9/022 47/33 |
| 5,853,239 | A * | 12/1998 | Laib | A47B 88/90 312/348.2 |
| 5,971,165 | A * | 10/1999 | Levins | A63F 9/001 211/43 |
| 7,155,865 | B2 * | 1/2007 | Rosenberg | E04B 1/12 52/79.9 |
| 7,628,313 | B2 | 12/2009 | Fry | |
| 7,631,799 | B2 | 12/2009 | Turvey et al. | |
| 7,909,000 | B1 * | 3/2011 | O'Neill | A01K 5/01 119/61.1 |
| 8,033,759 | B2 | 10/2011 | Davidsaver et al. | |
| 8,209,916 | B2 * | 7/2012 | Herron | E04B 2/12 52/79.5 |
| D668,988 | S * | 10/2012 | Gustafson | D11/143 |
| 9,149,006 | B1 * | 10/2015 | Pope | A01G 9/027 |
| 10,064,344 | B1 | 9/2018 | Meyer | |
| 10,501,232 | B1 * | 12/2019 | Price | B65D 21/083 |
| 2003/0183600 | A1 * | 10/2003 | Straka | B65D 9/18 217/13 |
| 2005/0246956 | A1 * | 11/2005 | Gonzalez Miguez | A01G 9/027 47/66.1 |
| 2007/0164514 | A1 * | 7/2007 | Chuang | A63F 9/10 273/157 R |
| 2012/0018949 | A1 * | 1/2012 | Fletcher | A63F 9/12 273/157 R |
| 2013/0134676 | A1 * | 5/2013 | Knell | A63F 9/12 273/156 |
| 2015/0353232 | A1 * | 12/2015 | Kandel | B65D 21/0204 220/574 |
| 2017/0258016 | A1 * | 9/2017 | Goshen | A01G 9/027 |

* cited by examiner

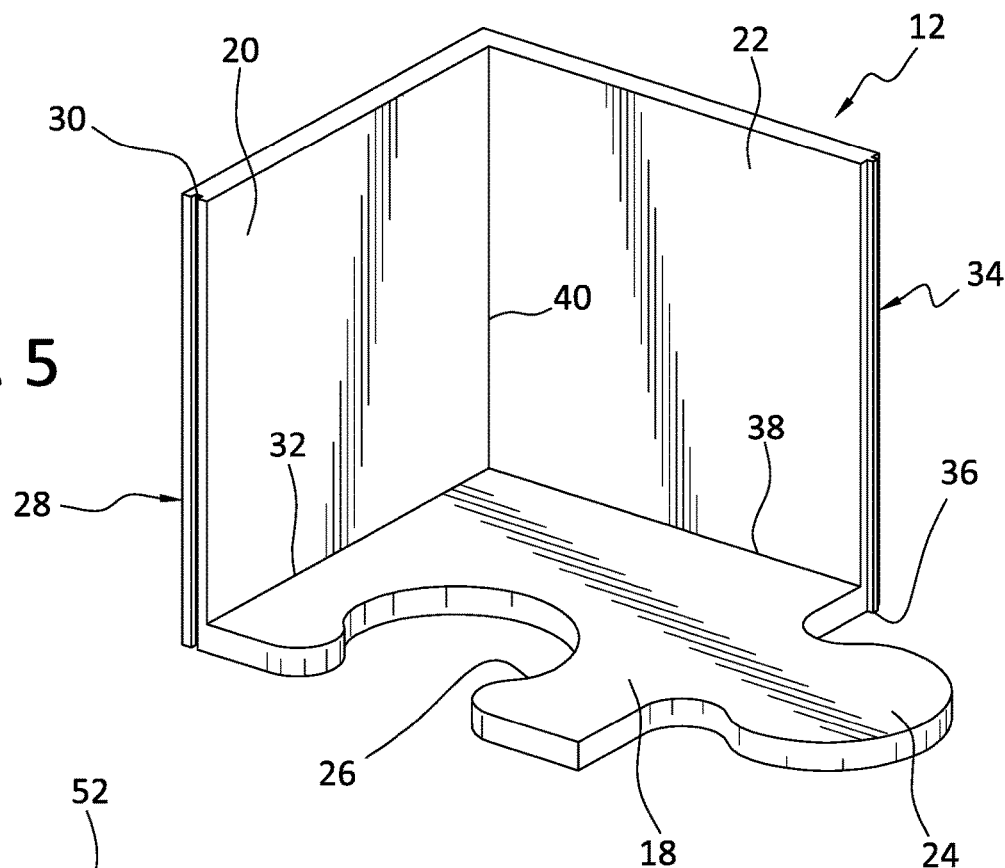
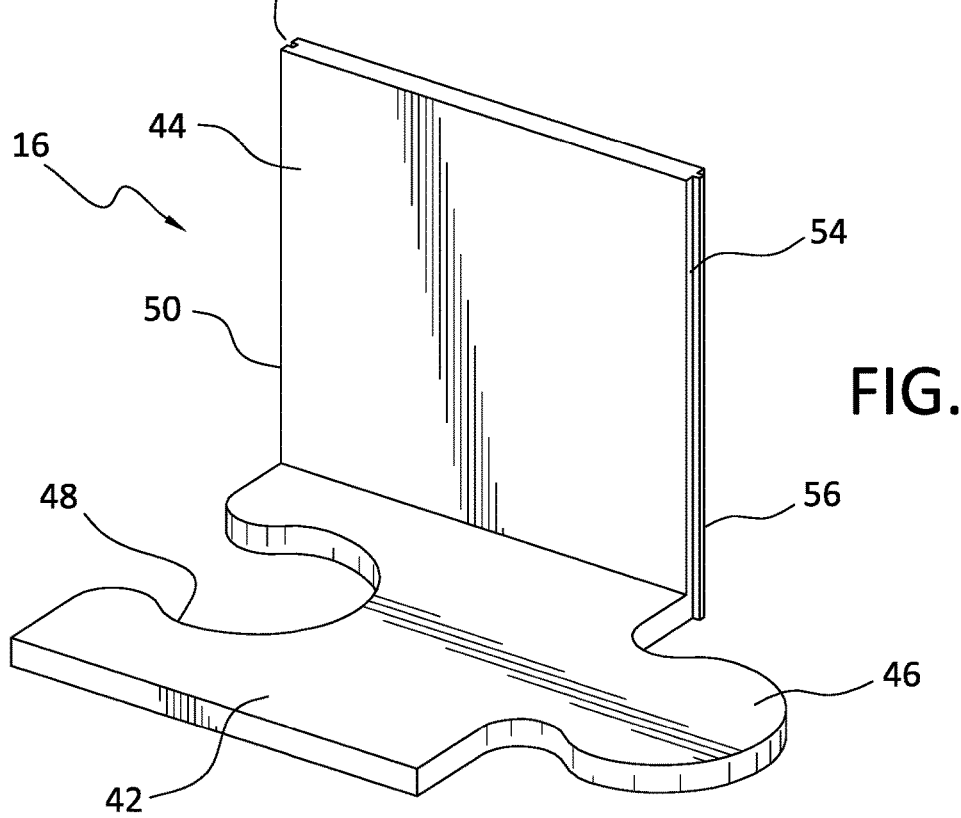

CONTAINER UTILIZING ANGLE ELEMENTS

BACKGROUND OF THE INVENTION

1. Field of the Invention

The present invention relates generally to containers and, more particularly to containers that utilize multiple uniquely shaped "puzzle" pieces that interlock to create a single assembly. When disassembled the puzzle pieces stack to provide ease in transport.

2. Description of the Related Art

There are various solutions for creating raised planter beds as well as various materials and methods of assembly. Some utilize permanent poured concrete. Others utilize actual concrete masonry units (concrete blocks) to form perimeter walls with an opening to the ground/soil they are placed on. These two methods involve materials that are very heavy and are mostly a permanent on-grade application. Wood member assemblies are common with varying lumber dimensions as well as varying planter box shape, length, width and height. They can also utilize wood piles driven into the soil to support the structural attachment of the wood members. Most woods that come in contact or close proximity to soil are subject to extensive moisture, potentially causing rot and decay thus shortening their durability and effective lifespan. Plastic members can be utilized in a similar fashion as wood members yet offer better life span due to greater resistance to rot and decay. Both wood and plastic assemblies, typically utilize perimeter walls with an opening to the ground/soil they are placed on.

Raised planters can be implemented using many different techniques and materials. For example, metal troughs can be used. Metal corrugated sheets may also be utilized to create a raised planter similar to the wood and plastic assemblies noted above. Practically anything with the capacity to hold soil can potentially be a raised planter, even, for example, discarded toilets, small boats, worn tires, wooden casks, trash cans, etc. There are also many raised planter "kits" for do it yourselfers utilizing combinations of the above noted assemblies. There can be challenges with many types of raised planter materials and assemblies. Some being too heavy, too large, too small, and/or aesthetically unappealing. Additionally, raised planters are difficult to transport, require complex assembly and are limited to a location requiring soil below.

SUMMARY OF THE INVENTION

In a broad aspect the present invention is embodied as a container (i.e. container kit) including a number of angle elements. Each angle element includes a) a horizontal puzzle member including a male knob at one end and a female lock at the other end; and, b) a vertical member including a vertically extending male adjunct at one end thereof and a vertically extending female adjunct at the other end thereof, the vertical member being integrally orthogonally connected to the horizontal puzzle member. The angle elements are configurable, i.e. can be assembled, to form a container by: engagement of the male knobs of the plurality of angle elements with female locks of adjacent angle elements; and, engagement of the vertically extending male adjuncts of the angle elements with female adjuncts of adjacent angle elements.

In one aspect, the present invention is embodied as a container, including four corner angle elements. Each corner angle element includes a horizontal portion, a first vertical portion, and a second vertical portion. The horizontal portion includes a projection and a recess oriented at right angles to each other. The first vertical portion includes a first exposed vertical edge with a continuous groove. The first vertical portion is integrally orthogonally connected to the horizontal portion at a first horizontal corner edge. The second vertical portion includes a second exposed vertical edge with a continuous tongue. The second vertical portion is integrally orthogonally connected to the horizontal portion at a second horizontal corner edge. The second vertical portion is integrally connected to the first vertical portion at a vertical corner edge. Thus, in its simplest form, the container footprint is shaped as a square. As will be disclosed below, derivations of the corner angle element may include, in addition to a 90 degree embodiment of the vertical portions to each other, also obtuse and acute angle applications.

Relative to the four corner angle element embodiment discussed above, the container may further include at least a pair of intermediate angle elements. Each intermediate angle element is positioned between two of the four corner angle elements. Each intermediate angle element includes a horizontal section and a vertical section. The horizontal section includes a male feature and a female feature oriented in line at opposite sides of the horizontal section. The vertical section includes a first exposed vertical sideline with a continuous channel and a second exposed vertical sideline with a continuous stabilizer. The vertical section is integrally orthogonally connected to the horizontal section. Use of the intermediate angle elements provides a rectangular footprint shape other than a square.

In additional embodiments, the container may include one or more L-shaped elements. Each L-shaped element includes an L-shaped horizontal part and an L-shaped vertical part. The L-shaped horizontal part includes a loop and a socket oriented at right angles to each other. The L-shaped vertical part includes a first exposed vertical periphery with a continuous depression and a second exposed vertical periphery with a continuous extension. The L-shaped horizontal part is integrally connected to the L-shaped vertical part at an inside corner edge. Use of such an L-shaped element provides L-shaped footprint features as part of the container. As will be discussed below, derivations of this L-shaped element may include, in addition to a 90 degree application, an obtuse and acute angle applications.

In one embodiment, a container includes multiple curved angle elements. Each curved angle element includes a horizontal arc component and a vertical arc component. The horizontal arc component includes an arc protrusion; and, an arc indent—at opposite ends of the horizontal arc component. The vertical arc component includes an exposed vertical fingerline with a continuous finger and an exposed vertical slotline with a continuous slot. The vertical arc component is integrally orthogonally connected to the horizontal arc component. The multiple curved angle elements are configurable to form the container by: 1) engagement of the arc protrusions of the multiple curved angle elements with arc indents of adjacent curved angle elements; and 2) engagement of the continuous fingers of the curved angle elements with continuous slots of adjacent corner elements.

Additional embodiments are discussed below.

BRIEF DESCRIPTION OF THE DRAWINGS

FIG. 5 is an enlarged perspective view of a corner angle element utilized in the container of the present invention.

FIG. 6 is an enlarged perspective view of an intermediate angle element utilized in the container of the present invention.

DETAILED DESCRIPTION OF THE INVENTION

Figure 1:
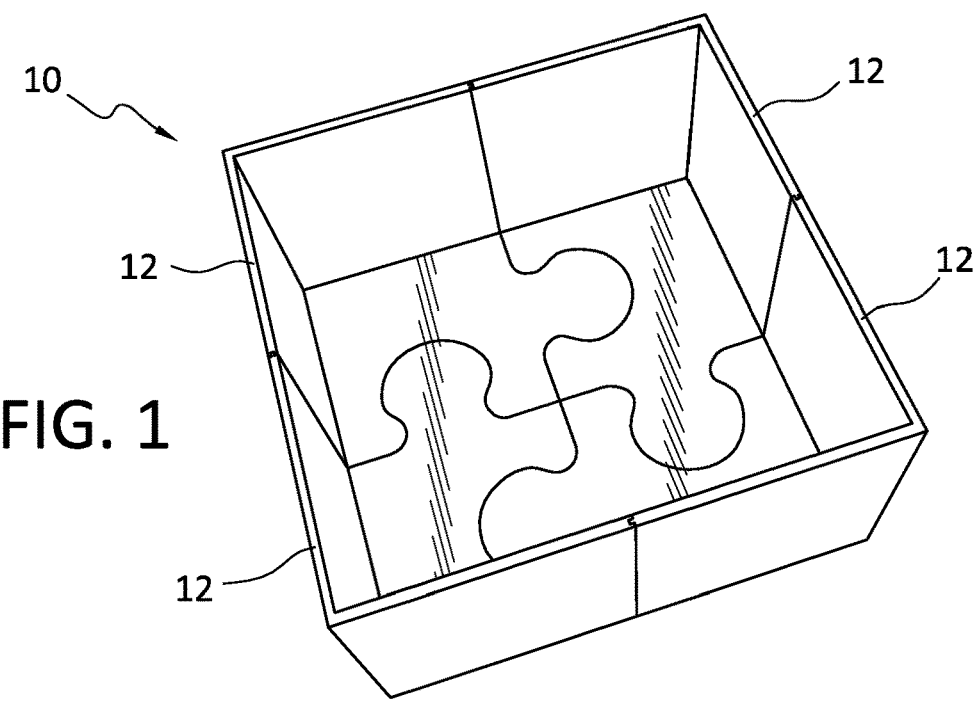
FIG. 1 is a perspective illustration of a first embodiment the present invention, embodied as a square container.
Figure 2:
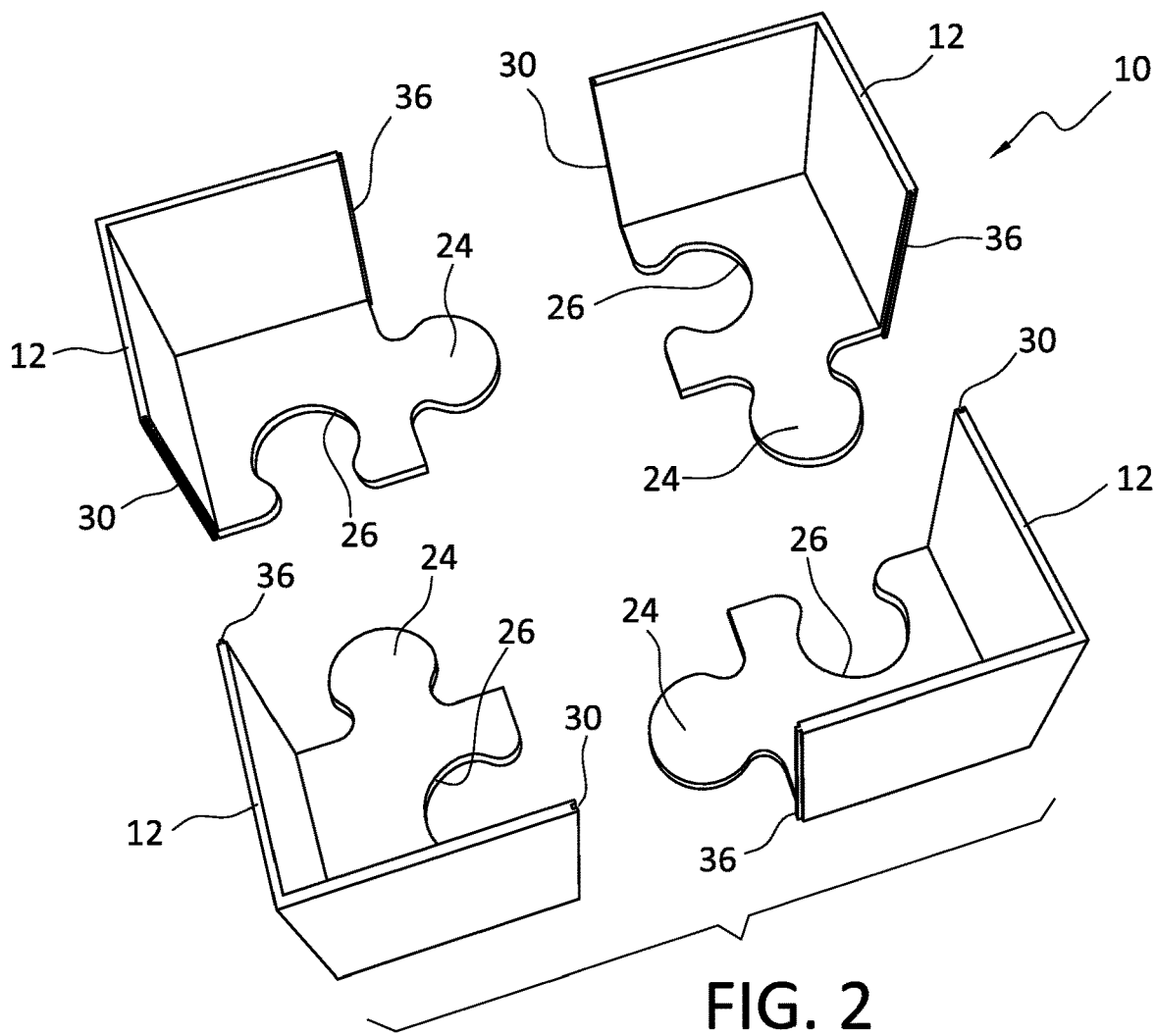
FIG. 2 is an exploded perspective view of the square container of FIG. 1.

Referring now to the drawings and the characters of reference marked thereon, FIGS. 1 and 2 show a first embodiment of the present invention, embodied as a square container, designated generally as 10. Container 10 includes four corner angle elements, each designated generally as 12. As will be disclosed below in detail, these corner angle elements 12 engage each other to provide a square container.

Figure 3:
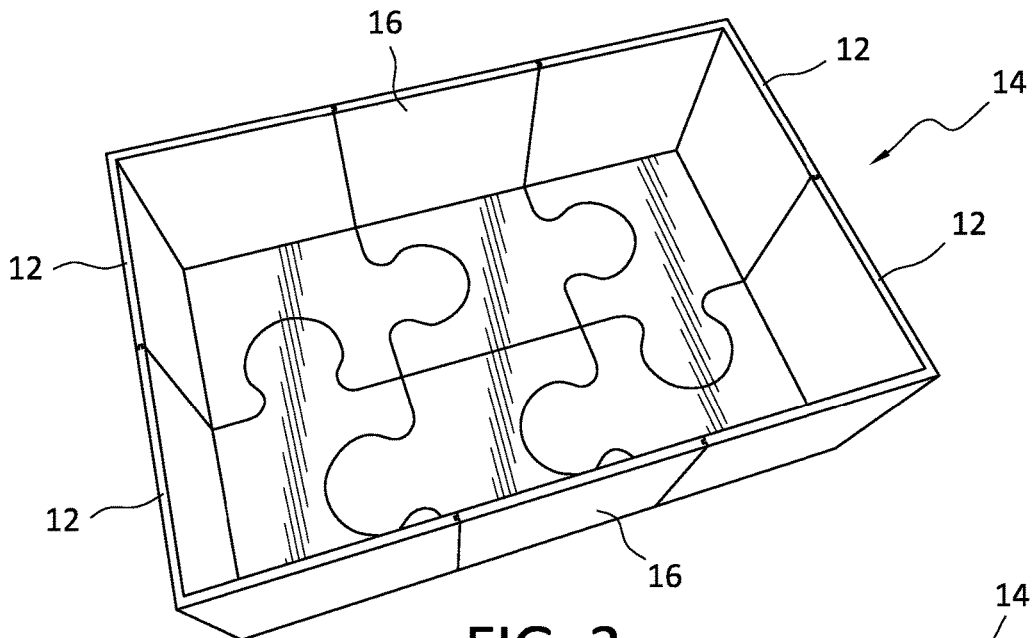
FIG. 3 is a perspective illustration of a second embodiment of the present invention, embodied as a rectangular container.
Figure 4:
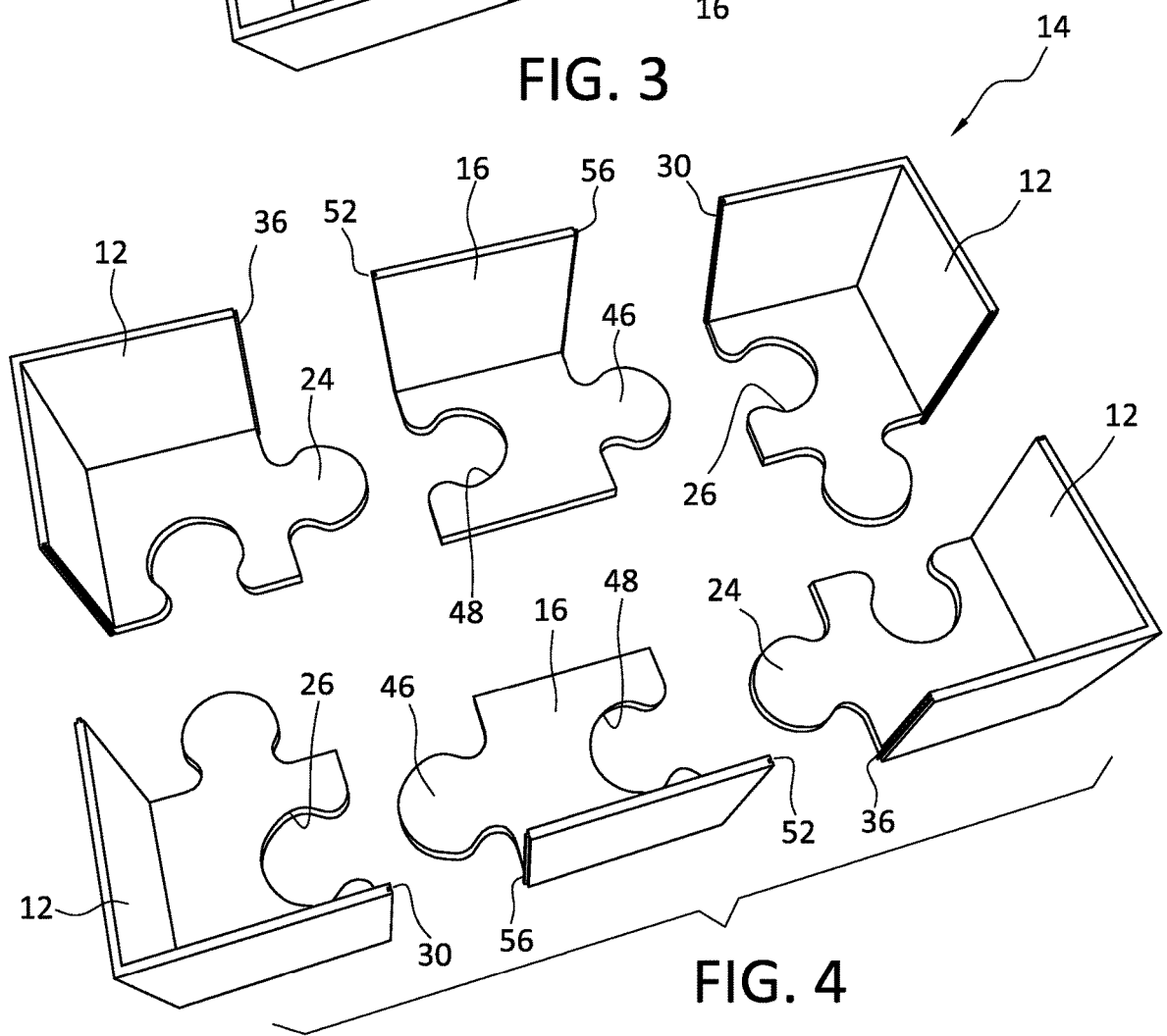
FIG. 4 is an exploded perspective view of the rectangular container of FIG. 3.

FIGS. 3 and 4 show a second embodiment of the present invention, embodied as a rectangular container, designated generally as 14. Container 14 includes four corner angle elements 12 and two intermediate angle elements 16. As will be disclosed below in detail, these corner angle elements 12 and intermediate angle elements 16 engage each other to provide a rectangular container.

FIG. 5 illustrates a corner angle element 12. Each corner angle element 12 includes a horizontal portion 18, a first vertical portion 20, and a second vertical portion 22. The horizontal portion 18 includes a projection 24 and a recess 26 oriented at right angles to each other. The first vertical portion 20 includes a first exposed vertical edge 28 with a continuous groove 30. The first vertical portion 20 is integrally orthogonally connected to the horizontal portion 18 at a first horizontal corner edge 32. The second vertical portion 22 including a second exposed vertical edge 34 with a continuous tongue 36. The second vertical portion 22 is integrally orthogonally connected to the horizontal portion 18 at a second horizontal corner edge 38. The second vertical portion 22 is integrally connected to the first vertical portion 20 at a vertical corner edge 40.

FIG. 6 illustrates an intermediate angle element 16. Each intermediate angle element 16 includes a horizontal section 42 and a vertical section 44. The horizontal section 42 includes a male feature 46 and a female feature 48 oriented in line at opposite sides of the horizontal section. The vertical section 44 includes a first exposed vertical sideline 50 with a continuous channel 52 and a second exposed vertical sideline 54 with a continuous stabilizer 56. The vertical section 44 is integrally orthogonally connected to the horizontal section 42.

Referring again now to FIGS. 1 and 2 it can be seen that four corner angle elements 12 can be joined to form a square container 10 by engagement of projections 24 with complementary recesses 26 of adjacent corner angle elements 12 and engagement of continuous tongues 36 with continuous grooves 30 of those adjacent corner elements 12.

Referring now to FIGS. 3 and 4, it can be seen that two intermediate angle elements 16 can be inserted between corner angle elements 12 to generate a rectangular container 14. This is accomplished by the engagement of projections 24 with female features 48. Additionally, the rectangular container 14 is assembled by the engagement of male features 46 and recesses 26. Furthermore, continuous stabilizers 56 from intermediate angle elements 16 engage with adjacent continuous grooves 30 of adjacent corner angle elements 12; and, continuous tongues 36 engage with continuous channels 52.

Using two corner elements 12 as an example of interlocking, one corner element 12 interlocks per a down vertical motion into the next element 12 per projection 24 and recess 26 at the horizontal portion 18. Simultaneously, the touching vertical edges will interlock per the same down vertical motion with the vertical insertion of the continuous tongue 36 into the continuous groove 30 at each respective vertical edge 34, 28.

Even though the various vertical edges of the various angle elements have been described as being continuous, it is understood that the term "continuous" can broadly be construed to include edges with crenellations, or other gaps.

The corner angle elements and the intermediate angle elements can be constructed of many different suitable materials, including plastics. One preferred plastic is HDPE (High-Density Polyethylene) which, as a common recycled plastic, has positive environmental aspects that are complimentary to the gardening industry and the sustainability/green/reduced carbon footprint movements.

Other suitable resilient materials include, for example, other types of plastics, polymers and composites, wood and wood by products, metals and alloys. Concrete/concrete epoxy and its derivations including but not limited to, light weight concrete, mixtures e.g. Glass Fiber Reinforced Concrete (GFRC), fiber cement, concrete epoxy/vinyl concrete.

Potential methods of manufacturing may include, for example, injection molding, extrusion, die-casting, machining and 3-D printing.

Potential 3-D printed materials may include, for example: metals, carbon fiber, wood & wood by products, concrete & concrete hybrids, plastics, nylons, ceramic, glass, and, epoxy resins.

Various decorative textures and colors may be used to provide representations of, for example, wood, concrete, and metal. Various finishes may be utilized, e.g. "sheen," gloss, semi-gloss, satin, eggshell, matte, etc.

Figure 7:
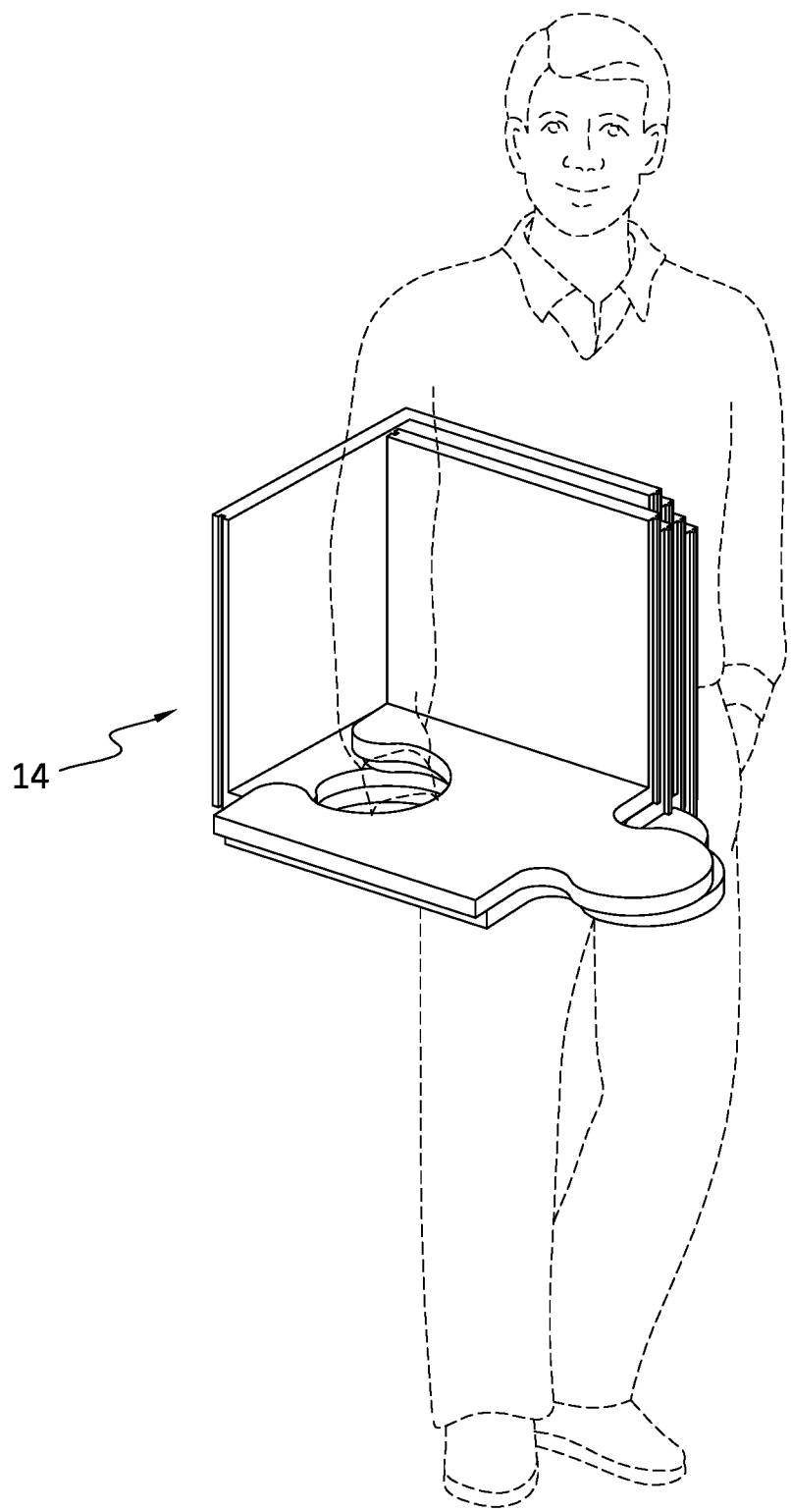
FIG. 7 is a perspective view of a disassembled container with the corner angle elements and intermediate angle elements being stacked and held by a user.

Referring now to FIG. 7, an advantage of the container of the present invention is illustrated by showing how in a disassembled state that various angle elements and intermediate elements can be stacked and held by a user easily by one arm. As can be seen, the male and female features, as well as the recesses and projections cooperate to form an opening in order for the user to insert an arm therethrough for easy handling.

Figure 8:
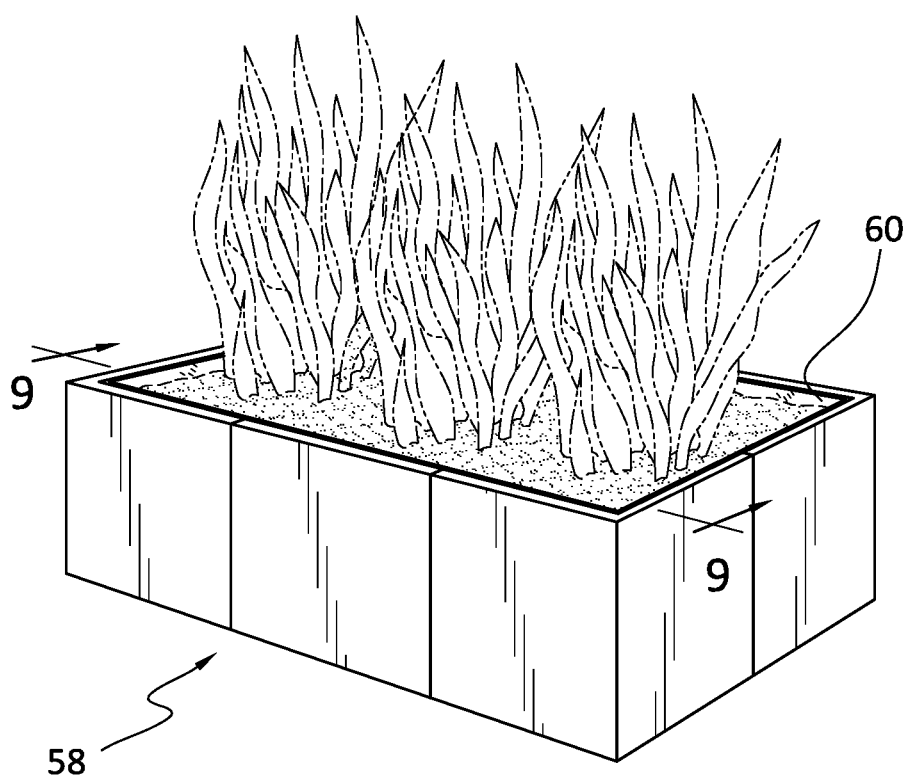
FIG. 8 is a perspective view of the container implemented as a planter box.
Figure 9:
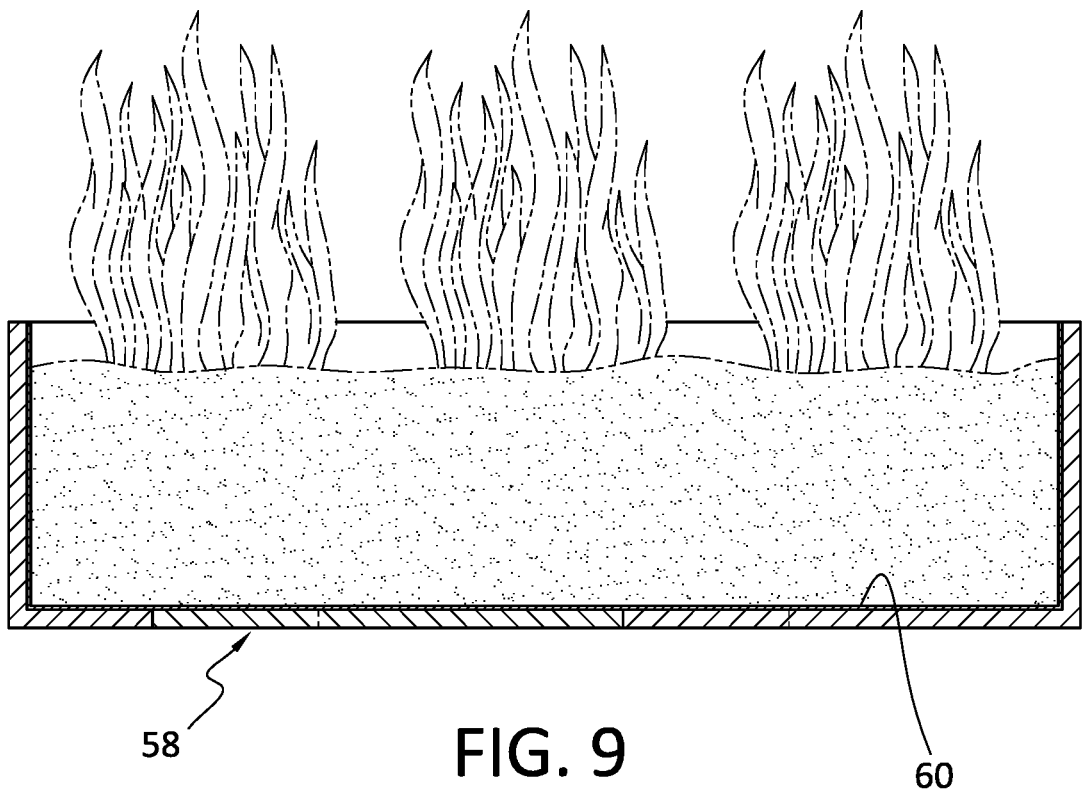
FIG. 9 is a cross sectional view taken along line 9-9 of FIG. 8.

Referring now to FIGS. 8 and 9 a container configured as a planter box is illustrated, designated generally as 58. The assembled product may include a liner 60 as desired. The general purpose of the liner 60 is to provide a waterproof planter box 58 container. Multiple applications may benefit from a container that can hold water and not seep moisture as is anticipated with standard outdoor planter applications. An indoor planter may have a waterproof liner so when watering interior plants the percolating water does not seep into the interior floor below the planter. Similarly, an exterior application of a liner 60 is where the planter container is on a hard surface like a concrete patio, a balcony or roof deck where there is a desire to avoid potential excessive water drainage and/or the possibility of water stains. The liner 60 can be used in a plant pond, Koi pond and/or a reflecting pond where waterproofing is necessary.

Figure 10:
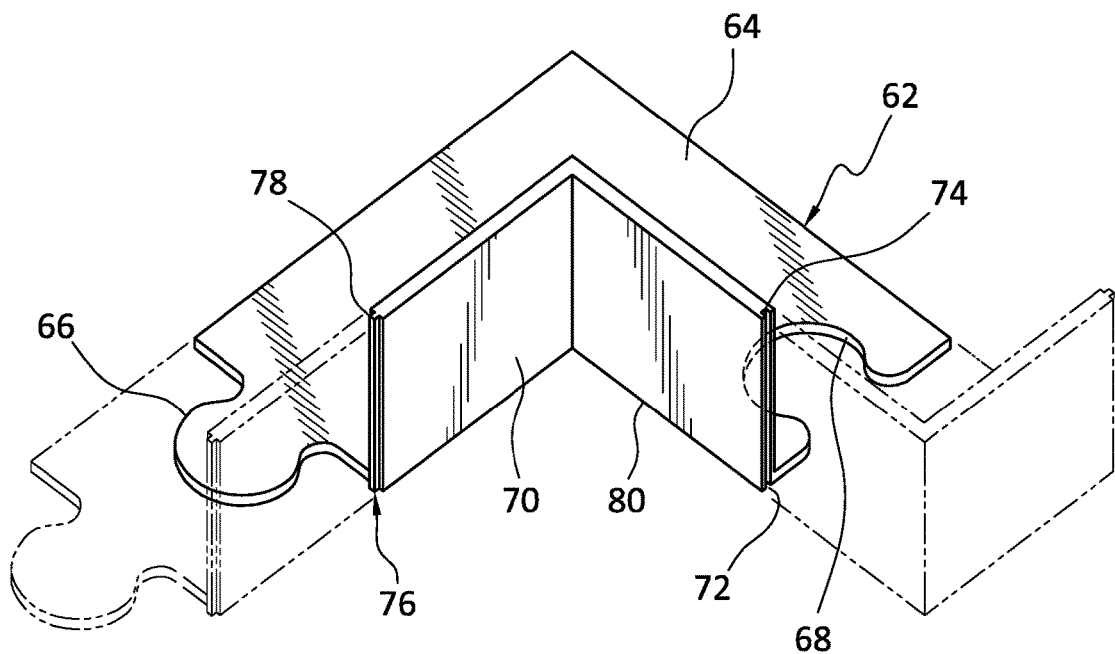
FIG. 10 illustrates a third embodiment of the container of the present invention which utilizes an L-shaped angle element for providing a container with L-shapes.

Referring now to FIG. 10, in another embodiment, the container includes L-shaped angle elements 62. Each L-shaped angle element 62 includes an L-shaped horizontal part 64 including a loop 66 and a socket 68 oriented at right angles to each other. An L-shaped vertical part 70 includes a first exposed vertical periphery 72 with a continuous depression 74 and a second exposed vertical periphery 76 with a continuous extension 78. The L-shaped horizontal part 64 is integrally connected to the L-shaped vertical part at an inside corner edge 80. Derivations of this element may include, in addition to a 90 degree application, obtuse and acute angle applications.

Figure 11:
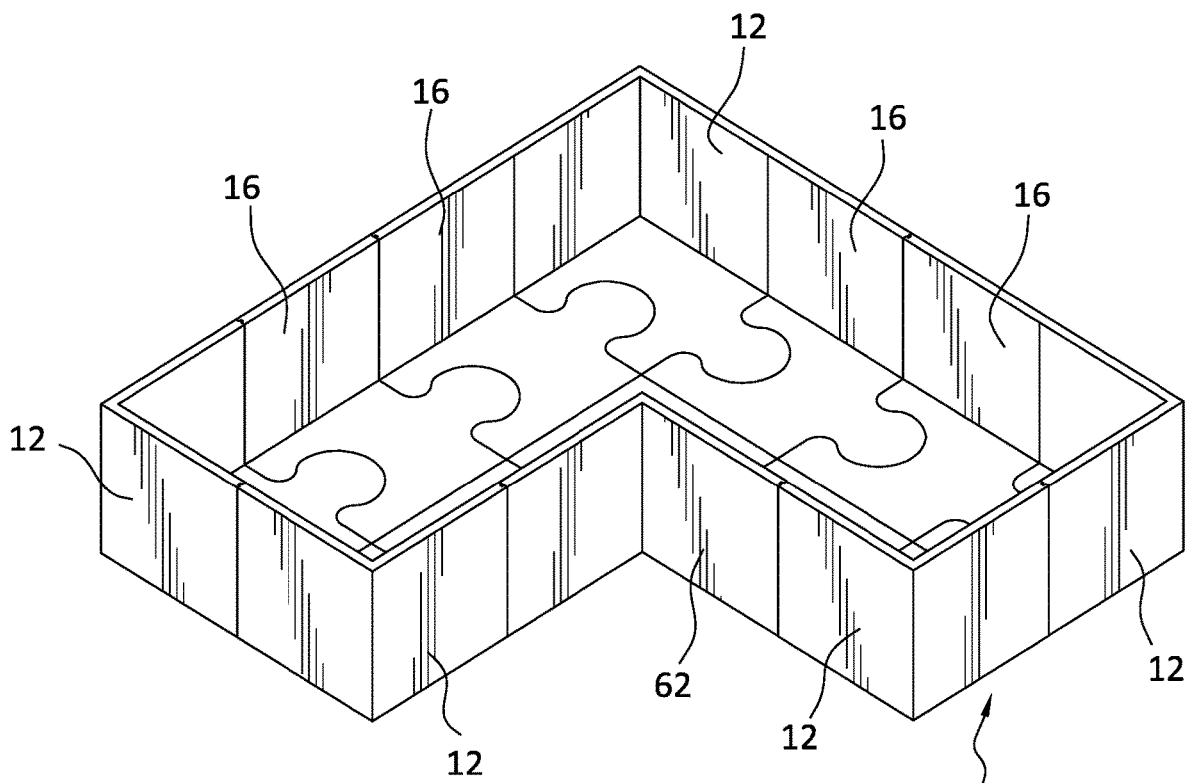
FIG. 11 is a perspective view of the container implemented as an L-shaped planter box.

As can be seen in FIG. 11, an L-shaped angle element 62 can be connected with corner angle elements 12 and adjacent corner angle elements 12 as well as additional intermediate angle elements 16 and corner angle elements 12 to generate as desired L-shaped container 82. Derivations of element 62 may include, in addition to a 90 degree application, an obtuse and acute angle application.

Figure 12:
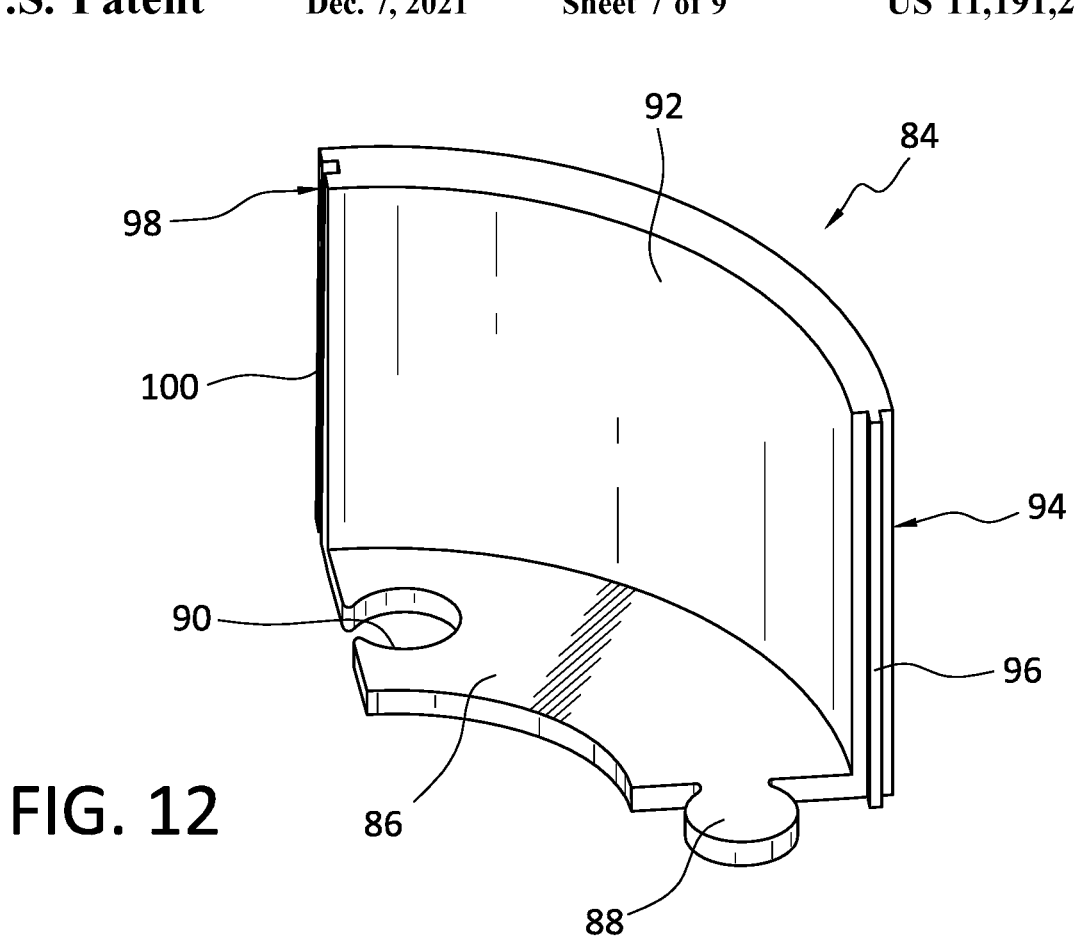
FIG. 12 is a perspective view of a curved angle element of another embodiment of the container.

Referring now to FIG. 12, another embodiment of an angle element is illustrated, in this embodiment the angle element being a curved angle element, designated generally as 84. Each curved angle element 84 includes a horizontal arc component 86 including an arc protrusion 88 and an arc indent 90 at opposite ends of the horizontal arc component 86.

The curved angle element 84 also includes a vertical arc component 92 including an exposed vertical fingerline 94 with a continuous finger 96; and, an exposed vertical slotline 98 with a continuous slot 100. The vertical arc component 92 is integrally orthogonally connected to the horizontal arc component 86.

Figure 13:
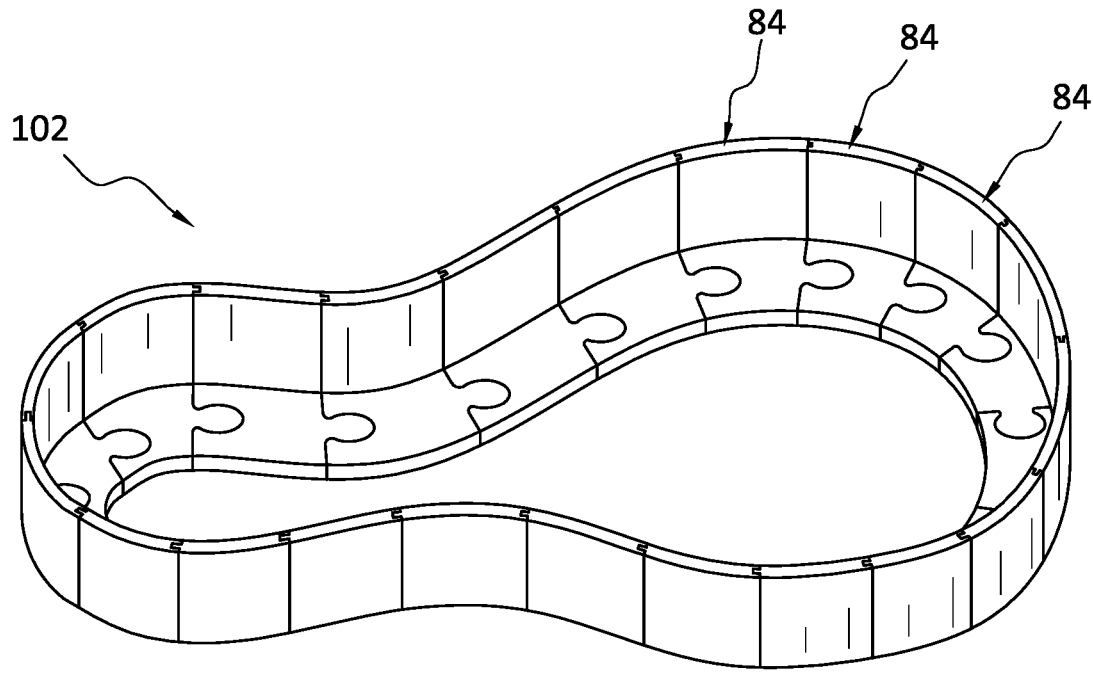
FIG. 13 shows an example of a container that can be assembled using curved angle elements of the type shown in FIG. 12.

The curved angle elements 84 are configurable to form containers, with freeform curves, i.e. "amoeba-shaped." An example of such an amoeba-shaped container is designated generally as 102 in FIG. 13. The container 102 includes multiple serially connected curved angle elements 84. The container 102 is configured by engagement of the arc protrusions 88 of the curved angle elements 84 with arc indents 90 of adjacent curved angle elements 84; and engagement of the continuous fingers 96 of the curved angle elements 84 with the continuous slots 100 of adjacent corner elements 84. As can be seen in FIG. 13 the curved angle elements 84 can be convex or concave.

Figure 14:
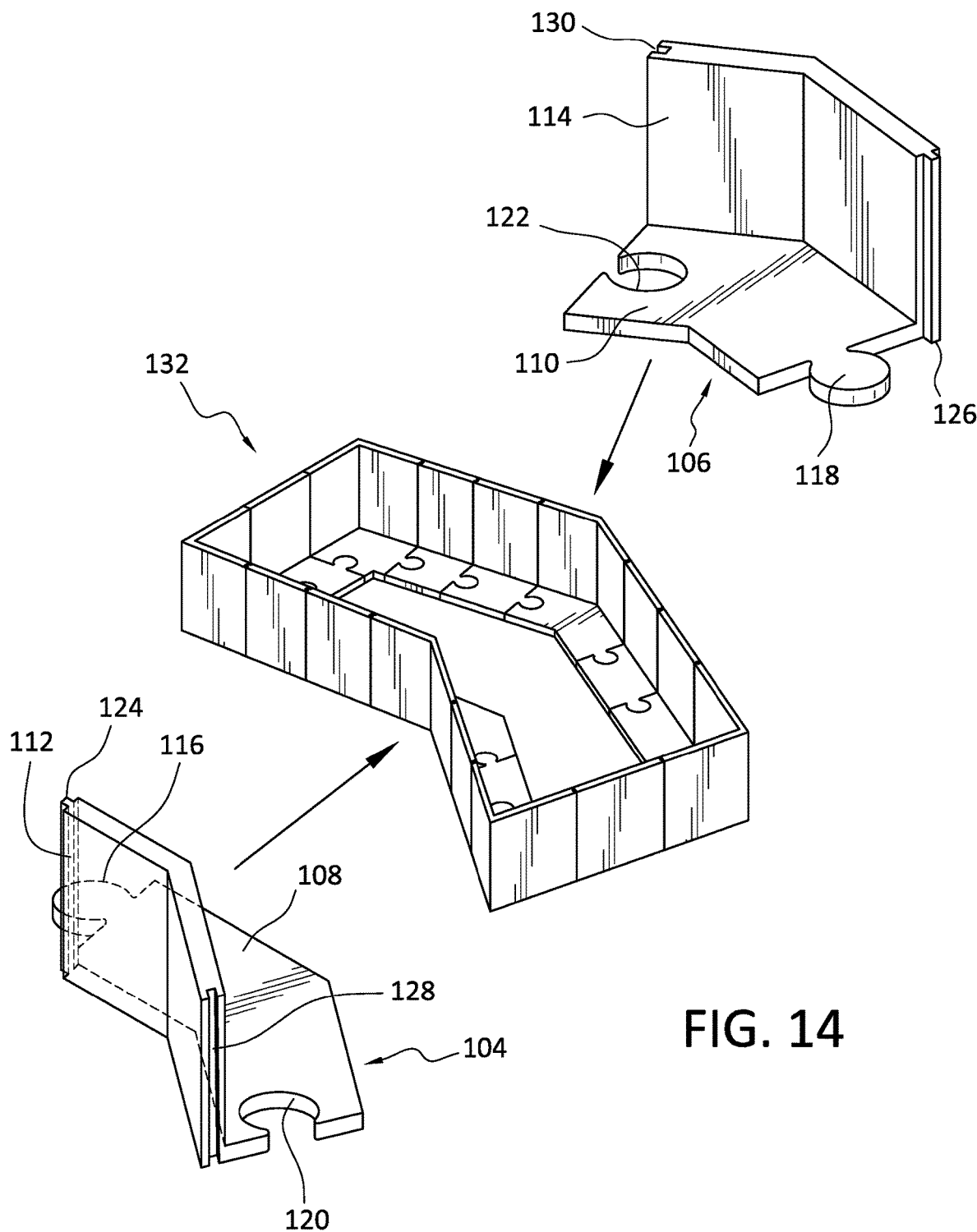
FIG. 14 are perspective illustrations of an obtuse inside element, an obtuse outside element, and an example of a container assembled using those elements.

Referring now to FIG. 14, other embodiments of an angle element is illustrated, in this embodiment the angle elements being obtuse angle elements, designated generally as 104 and 106. Obtuse element 104 is an obtuse inside element and obtuse element 106 is an obtuse outside element. Each obtuse angle element 104, 106 includes a horizontal obtuse angle component 108, 110, respectively, including an obtuse angle protrusion 116, 118 and an obtuse angle indent 120, 122 at opposite ends of the horizontal obtuse angle component 108, 110.

Each obtuse angle element 104, 106 also includes a vertical obtuse angle component 112, 114 including obtuse angle stabilizer 124, 126; and, obtuse angle slot 128, 130.

The obtuse angle elements 104, 106 can be used to form an "obtuse container", designated generally as 132.

Figure 15:
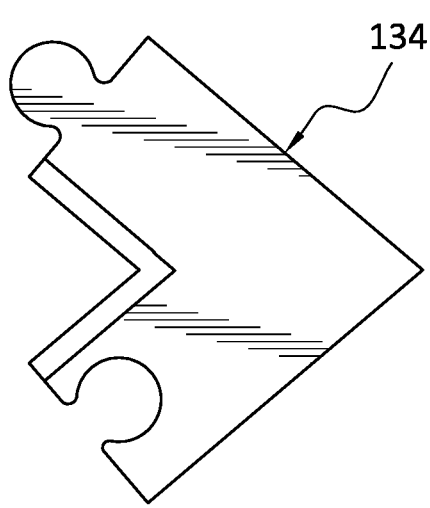
FIG. 15 illustrates an acute inside angle element.
Figure 16:
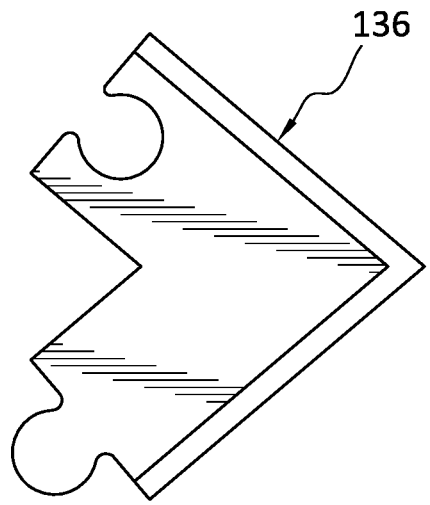
FIG. 16 illustrates an acute outside angle element.
Figure 17:
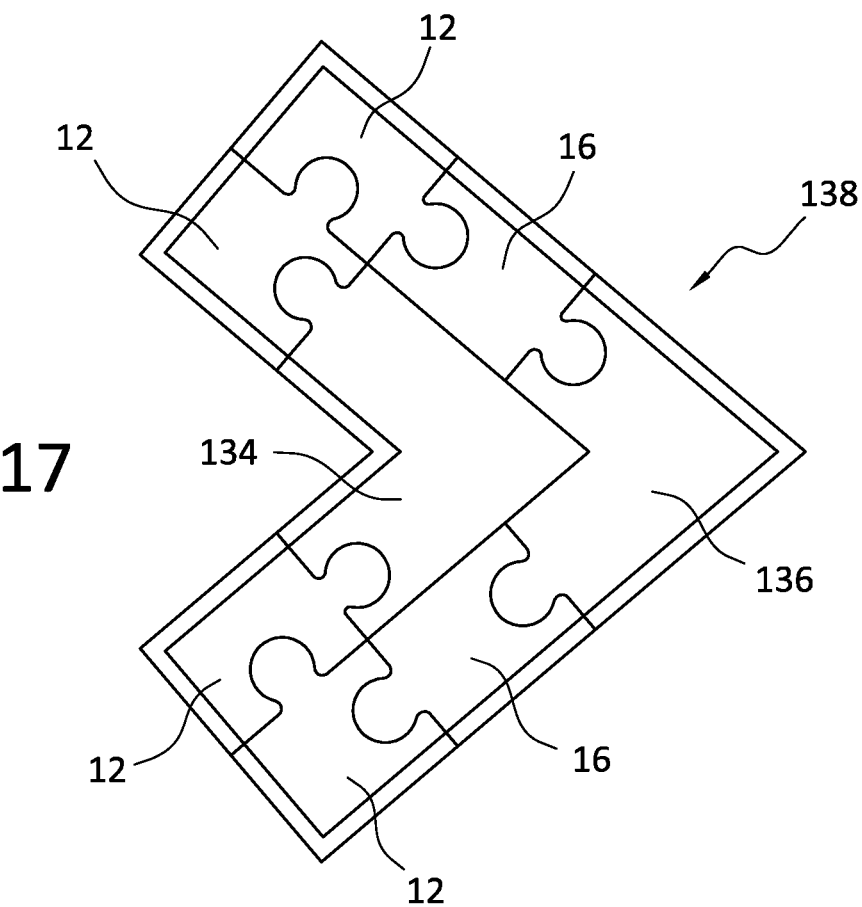
FIG. 17 is a schematic illustration showing an example of a container assembled using acute inside elements and acute outside elements.

Similarly, as shown in FIGS. 15-17, acute angle elements, including acute inside angle elements 134 and acute outside angle elements 136 can be used to form an "acute container," designated generally as 138.

In each of the embodiments discussed above the container includes a plurality of angle elements. In each case the angle element includes a horizontal puzzle member and a vertical member. In each case the horizontal puzzle member includes a male knob at one end and a female lock at the other end. In each case the vertical member includes a vertically extending male adjunct at one end thereof and a vertically extending female adjunct at the other end thereof. And, in each case the plurality of angle elements are configurable to form a container by: 1) engagement of the male knobs of the plurality of angle elements with female locks of adjacent angle elements; and 2) engagement of the vertically extending male adjuncts of the angle elements with female adjuncts of adjacent angle elements.

The parts correlation is as follows:
FIG. 5—corner angle element 12
horizontal puzzle member—horizontal portion 18
vertical member—vertical portion 20
male knob—projection 24
female lock—recess 26
vertically extending male adjunct—continuous tongue 36
vertically extending female adjunct—continuous groove 30
FIG. 6—intermediate angle element 16
horizontal puzzle member—horizontal section 42
vertical member—vertical section 44
male knob—male feature 46
female lock—female feature 48
vertically extending male adjunct—continuous stabilizer 56
vertically extending female adjunct—continuous channel 52
FIG. 10—L-shaped angle element 62
horizontal puzzle member—L-shaped horizontal part 64
vertical member—L-shaped vertical part 70
male knob—loop 66
female lock—socket 68
vertically extending male adjunct—continuous extension 78
vertically extending female adjunct—continuous depression 74
FIG. 12—curved angle element 84
horizontal puzzle member—horizontal arc component 86
vertical member—vertical arc component 92
male knob—arc protrusion 88
female lock—arc indent 90 vertically extending male adjunct—continuous finger 96
vertically extending female adjunct—continuous slot 100
FIG. 14—obtuse angle element 104, 106
horizontal puzzle member—horizontal obtuse angle component 108, 110
vertical member—vertical obtuse angle component 112, 114
male knob—obtuse angle protrusion 116, 118
female lock—obtuse angle indent 120, 122
vertically extending male adjunct—obtuse angle stabilizer 124, 126
vertically extending female adjunct—obtuse angle slot 128, 130

The unique combination of puzzle piece type connections on the horizontal aspects of the assembled container, male/female connection on the vertical edges (ends) of the vertical aspects of the angle elements; and utilization of such angle elements having orthogonal integral connections of the horizontal puzzle member and vertical member, provide features that synergistically cooperate to provide easy transportation and assembly.

Other embodiments and configurations may be devised without departing from the spirit of the invention and the scope of the appended claims. For example, although the present invention has been discussed with it applicability as a planter container or pond container, the assembly may also be implemented as a container that may be applicable to store pool toys/accessories, a mulch pile, reptile pen, a large cooler with ice, firewood, home recycling bins or most anything needing to be contained in such a manner.

The invention claimed is:

1. A container kit, comprising:
 a plurality of angle elements, each angle element, comprising:
  a) a horizontal puzzle member including a male knob at one end and a female lock at another end; and,
  b) a vertical member including a vertically extending male adjunct at one end thereof and a vertically extending female adjunct at another other end thereof, said vertical member being integrally orthogonally connected to said horizontal puzzle member, wherein said plurality of angle elements are configurable to form a container by:
   engagement of said male knobs of said plurality of angle elements with female locks of adjacent angle elements; and
   engagement of said vertically extending male adjuncts of said angle elements with female adjuncts of adjacent angle elements, wherein said engagement of said vertically extending male adjuncts of said angle elements with female adjuncts of adjacent angle elements comprises a sliding vertical motion.

2. The container kit of claim 1, wherein said plurality of angle elements comprises:
 four corner angle elements, each corner angle element comprising:
  a) a horizontal portion including a projection and a recess oriented at right angles to each other;
  b) a first vertical portion including a first exposed vertical edge with a continuous groove, said first vertical portion being integrally orthogonally connected to said horizontal portion at a first horizontal corner edge; and,
  c) a second vertical portion including a second exposed vertical edge with a continuous tongue, said second vertical portion being integrally orthogonally connected to said horizontal portion at a second horizontal corner edge,
  said second vertical portion being integrally connected to said first vertical portion at a vertical corner edge,
  wherein said horizontal portion comprises said horizontal puzzle member;
  said projection comprises said male knob;
  said recess comprises said female lock;
  said first vertical portion and said second vertical portion comprise said vertical member;
  said continuous tongue comprises said vertically extending male adjunct; and,
  said continuous groove comprises said vertically extending female adjunct.

3. The container kit of claim 2, said plurality of angle elements further comprising:
 at least a pair of intermediate angle elements, each intermediate angle element positioned between two of said four corner angle elements, comprising:
  a) a horizontal section including a male feature and a female feature oriented in line at opposite sides of the horizontal section;
  b) a vertical section including a first exposed vertical sideline with a continuous channel and a second exposed vertical sideline with a continuous stabilizer, said vertical section being integrally orthogonally connected to said horizontal section,
 wherein said horizontal section comprises said horizontal puzzle member;
 said male feature comprises said male knob;
 said female feature comprises said female lock;
 said vertical section comprises said vertical member;
 said continuous stabilizer comprises said vertically extending male adjunct; and,
 said continuous channel comprises said vertically extending female adjunct.

4. The container kit of claim 2, said plurality of angle elements further comprising:
 an L-shaped angle element, comprising:
  a) an L-shaped horizontal part including a loop and a socket oriented at right angles to each other;
  b) an L-shaped vertical part including a first exposed vertical periphery with a continuous depression and a second exposed vertical periphery with a continuous extension,
  said L-shaped horizontal part being integrally connected to said L-shaped vertical part at an inside corner edge,
  wherein said L-shaped horizontal part comprises said horizontal puzzle member;
  said loop comprises said male knob;
  said socket comprises said female lock;
  said L-shaped vertical part comprises said vertical member;
  said continuous extension comprises said vertically extending male adjunct; and,
  said continuous depression comprises said vertically extending female adjunct.

5. The container kit of claim 2 wherein said four corner angle elements comprise a square container.

6. The container kit of claim 2, wherein said four corner angle elements are configurable to form a square container by:

engagement of said projections of said corner angle elements with recesses of adjacent corner angle elements; and engagement of said continuous tongues of said corner angle elements with continuous grooves of adjacent corner elements.

7. The container kit of claim 3, wherein said four corner angle elements and said at least a pair of intermediate angle elements are configurable to form a rectangular container by:

engagement of said male features of the intermediate angle elements with said recesses of adjacent corner angle elements;

engagement of said female features of the intermediate angle elements with projections of adjacent corner angle elements;

engagement of said continuous tongues of said corner angle elements with continuous channels of adjacent intermediate angle elements; and, engagement of continuous grooves of the corner angle elements with continuous stabilizers of adjacent intermediate angle elements.

8. The container kit of claim 7, wherein said at least a pair of intermediate angle elements comprises at least four intermediate angle elements, including at least two pairs of adjacent intermediate angle elements, configured to create an elongated rectangular shape.

9. The container kit of claim 1, wherein said plurality of angle elements comprises a plurality of curved angle elements, each curved angle element, comprising:

a) a horizontal arc component including an arc protrusion and an arc indent at opposite ends of the horizontal arc component; and, b) a vertical arc component including an exposed vertical fingerline with a continuous finger and an exposed vertical slotline with a continuous slot, said vertical arc component being integrally orthogonally connected to said horizontal arc component, wherein said plurality of curved angle elements are configurable to form a container by:

engagement of said arc protrusions of said plurality of curved angle elements with arc indents of adjacent curved angle elements; and engagement of said continuous fingers of said curved angle elements with continuous slots of adjacent curved elements, wherein said horizontal arc component comprises said horizontal puzzle member;

said arc protrusion comprises said male knob;

said arc indent comprises said female lock;

said vertical arc component comprises said vertical member;

said continuous finger comprises said vertically extending male adjunct; and, said continuous slot comprises said vertically extending female adjunct.

10. The container kit of claim 1, wherein said plurality of angle elements comprises a plurality of obtuse angle elements, each obtuse angle element, comprising:

a) a horizontal obtuse angle component including an obtuse angle protrusion and an obtuse angle indent at opposite ends of the horizontal obtuse angle component; and, b) a vertical obtuse angle component including an obtuse angle stabilizer and an obtuse angle slot, wherein said plurality of obtuse angle elements are configurable to form a container by:

engagement of said obtuse angle protrusions of said plurality of obtuse angle elements with obtuse angle indents of adjacent obtuse angle elements; and engagement of said obtuse angle stabilizers of said obtuse angle elements with obtuse angle slots of adjacent obtuse angle elements, wherein said horizontal obtuse angle component comprises said horizontal puzzle member;

said obtuse angle protrusion comprises said male knob;

said obtuse angle indent comprises said female lock;

said vertical obtuse angle component comprises said vertical member;

said obtuse angle stabilizer comprises said vertically extending male adjunct; and, said obtuse angle stabilizer comprises said vertically extending female adjunct.

11. The container kit of claim 1, wherein said plurality of angle elements comprises a plurality of acute angle elements.

12. The container kit of claim 1, further comprising a liner for insertion.

13. A method for assembling a container, comprising:

a) providing a plurality of angle elements, each angle element, comprising:

i. a horizontal puzzle member including a male knob at one end and a female lock at another end; and, ii. a vertical member including a vertically extending male adjunct at one end thereof and a vertically extending female adjunct at another end thereof, said vertical member being integrally orthogonally connected to said horizontal puzzle member;

b) engaging said male knobs of said angle elements with female locks of adjacent angle elements; and, c) engaging said vertically extending male adjuncts of said angle elements with vertically extending female adjuncts of adjacent elements, wherein said engagement of said vertically extending male adjuncts of said angle elements with female adjuncts of adjacent angle elements comprises a sliding vertical motion.

14. A method for assembling a container, comprising:

a) providing four corner angle elements, each corner angle element, comprising:

i. a horizontal portion including a projection and a recess oriented at right angles to each other;

ii. a first vertical portion including a first exposed vertical edge with a continuous groove, said first vertical portion being integrally orthogonally connected to said horizontal portion at a first horizontal corner edge; and, iii. a second vertical portion including a second exposed vertical edge with a continuous tongue, said second vertical portion being integrally orthogonally connected to said horizontal portion at a second horizontal corner edge, said second vertical portion being integrally connected to said first vertical portion at a vertical corner edge;

b) providing at least a pair of intermediate angle elements, each intermediate angle element positioned between two of said four corner angle elements, comprising:

i. a horizontal section including a male feature and a female feature oriented in line at opposite sides of the horizontal section; and, ii. a vertical section including a first exposed vertical sideline with a continuous channel and a second exposed vertical sideline with a continuous stabilizer, said vertical section being integrally orthogonally connected to said horizontal section;
c) engaging said projections of said corner angle elements with recesses of another adjacent corner angle element, or another intermediate angle element;
d) engaging continuous tongues of said corner angle elements with continuous grooves of another adjacent corner angle element, or another intermediate angle element;
e) engaging said male features of the intermediate elements with said recesses of another adjacent corner angle element, or another intermediate angle element;
f) engaging said female features of the intermediate elements with projections of another adjacent corner angle element, or another intermediate angle element;
g) engaging said continuous tongues of said corner angle elements with continuous channels of adjacent intermediate angle elements; and,
h) engaging continuous grooves of the corner angle elements with continuous stabilizers of adjacent intermediate angle elements.

\* \* \* \* \*